United States Patent
Wong et al.

(10) Patent No.: US 12,046,054 B2
(45) Date of Patent: Jul. 23, 2024

(54) ADAPTIVE TEXT RECOGNITION

(71) Applicant: Black Sesame Technologies Inc., San Jose, CA (US)

(72) Inventors: Zi Sian Wong, Singapore (SG); Bo Li, Singapore (SG)

(73) Assignee: Black Sesame Technologies Inc., San Jose, CA (US)

( * ) Notice: Subject to any disclaimer, the term of this patent is extended or adjusted under 35 U.S.C. 154(b) by 384 days.

(21) Appl. No.: 17/586,724

(22) Filed: Jan. 27, 2022

(65) Prior Publication Data

US 2023/0237816 A1 Jul. 27, 2023

(51) Int. Cl.
*G06F 3/01* (2006.01)
*G06N 20/20* (2019.01)
*G06V 20/58* (2022.01)
*G06V 20/62* (2022.01)

(52) U.S. Cl.
CPC .......... *G06V 20/625* (2022.01); *G06N 20/20* (2019.01); *G06V 20/582* (2022.01)

(58) Field of Classification Search
CPC .... G06F 40/106; G06F 3/0485; G06F 16/285; G06F 16/244; G06N 20/00; G06N 20/20; G06K 9/6256; G06V 20/625; G06V 20/582
See application file for complete search history.

(56) References Cited

U.S. PATENT DOCUMENTS

2022/0318669 A1* 10/2022 Alexander ........... G06N 3/0455
2022/0382784 A1* 12/2022 Osuala ................. G06F 16/285

FOREIGN PATENT DOCUMENTS

CN 105373794 B 2/2018

OTHER PUBLICATIONS

Anagnostopoulos et al., "A License Plate-Recognition Algorithm for Intelligent Transportation System Applications," IEEE Transactions on Intelligent Transportation Systems (2006), 17 pages.
Elihos et al., "Deep Learning Based Segmentation Free License Plate Recognition Using Roadway Surveillance Camera Images," arXiv preprint arXiv:1912.02441, 4 pages.

(Continued)

*Primary Examiner* — Phuoc H Doan
(74) *Attorney, Agent, or Firm* — Fish & Richardson P.C.

(57) ABSTRACT

Methods, systems, and apparatuses, including computer programs encoded on computer storage media, for generating a prediction of at least a text and a particular type associated with an object are described in this specification. A first model output is generated by using a first machine learning model to process input data including one or more objects. The first model output identifies an existence of a particular object in the input data and specifies characteristics of the particular object. A type of the particular object is determined based on the specified characteristics. The type comprises a single-row type and a multi-row type. A single-row representation of the particular object is generated. A second model output is generated by processing the single-row representation. The second model output comprises a prediction of characters corresponding to the particular vehicle license plate.

20 Claims, 8 Drawing Sheets

(56) References Cited

OTHER PUBLICATIONS

Graves et al., "Connectionist Temporal Classification: Labelling Unsegmented Sequence Data with Recurrent Neural Networks," in Proc. of the $23^{rd}$ International Conference on Machine Learning (ICML), 2006, 8 pages.
Liu et al., "SSD: Single Shot MultiBox Detector," arXiv:1512.02325v5 (2016), 17 pages.
Nobuyuki, "A Threshold Selection Method from Gray-Level Histograms," IEEE Transactions on Systems, Man, and Cybernetics, vol. SMC-9, No. 1, pp. 62-66, Jan. 1979.
Vishal, et al., "Deep Automatic License Plate Recognition System," in Proc. of the Tenth Indian Conference on Computer Vision, Graphics and Image Processing (ICVGIP) 2016, 8 pages.
Zherzdev and Gruzdev, "LPRNet: License Plate Recognition via Deep Neural Networks," arXiv:1806.10447v1 (2018), 6 pages.

* cited by examiner

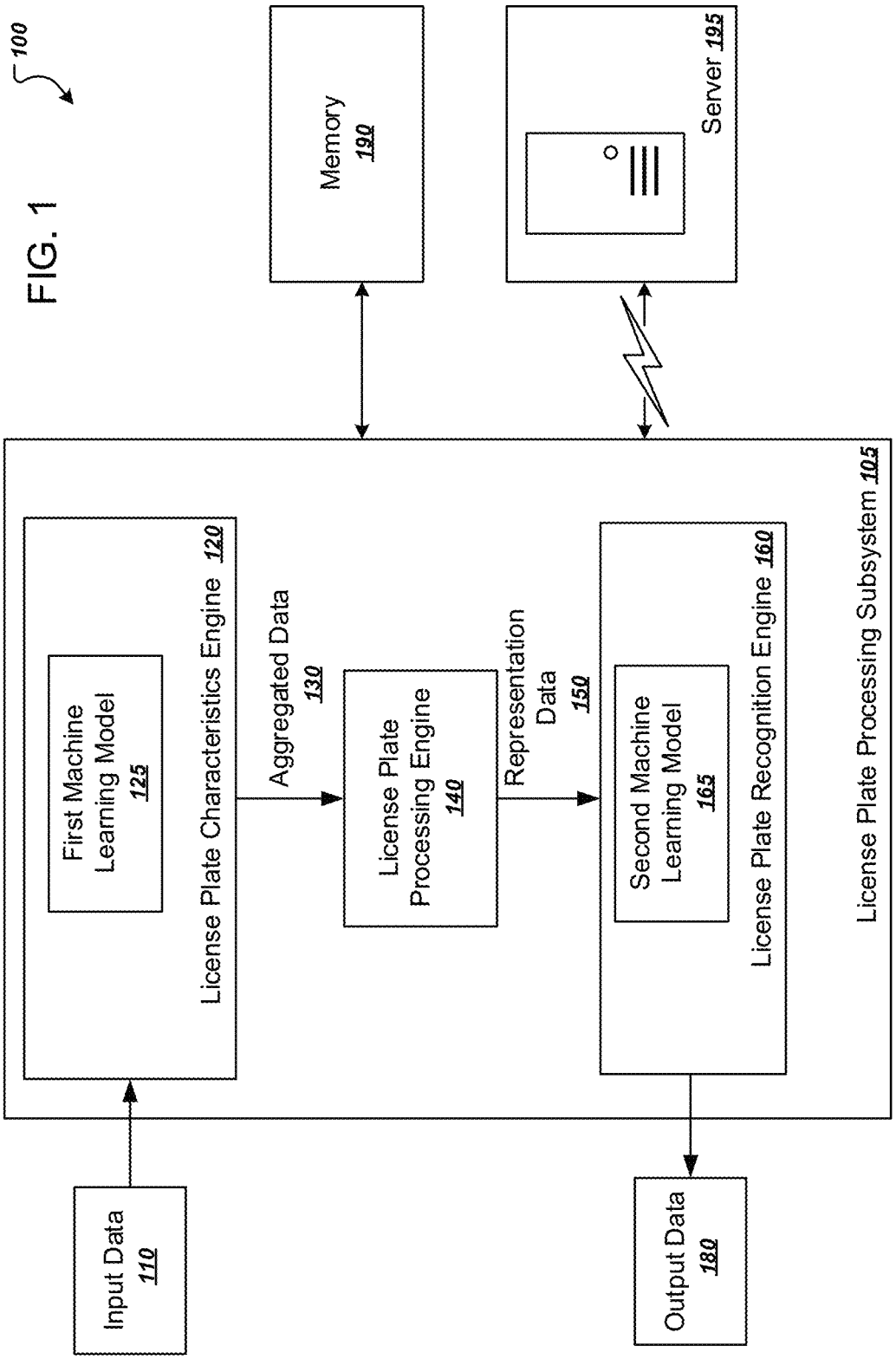

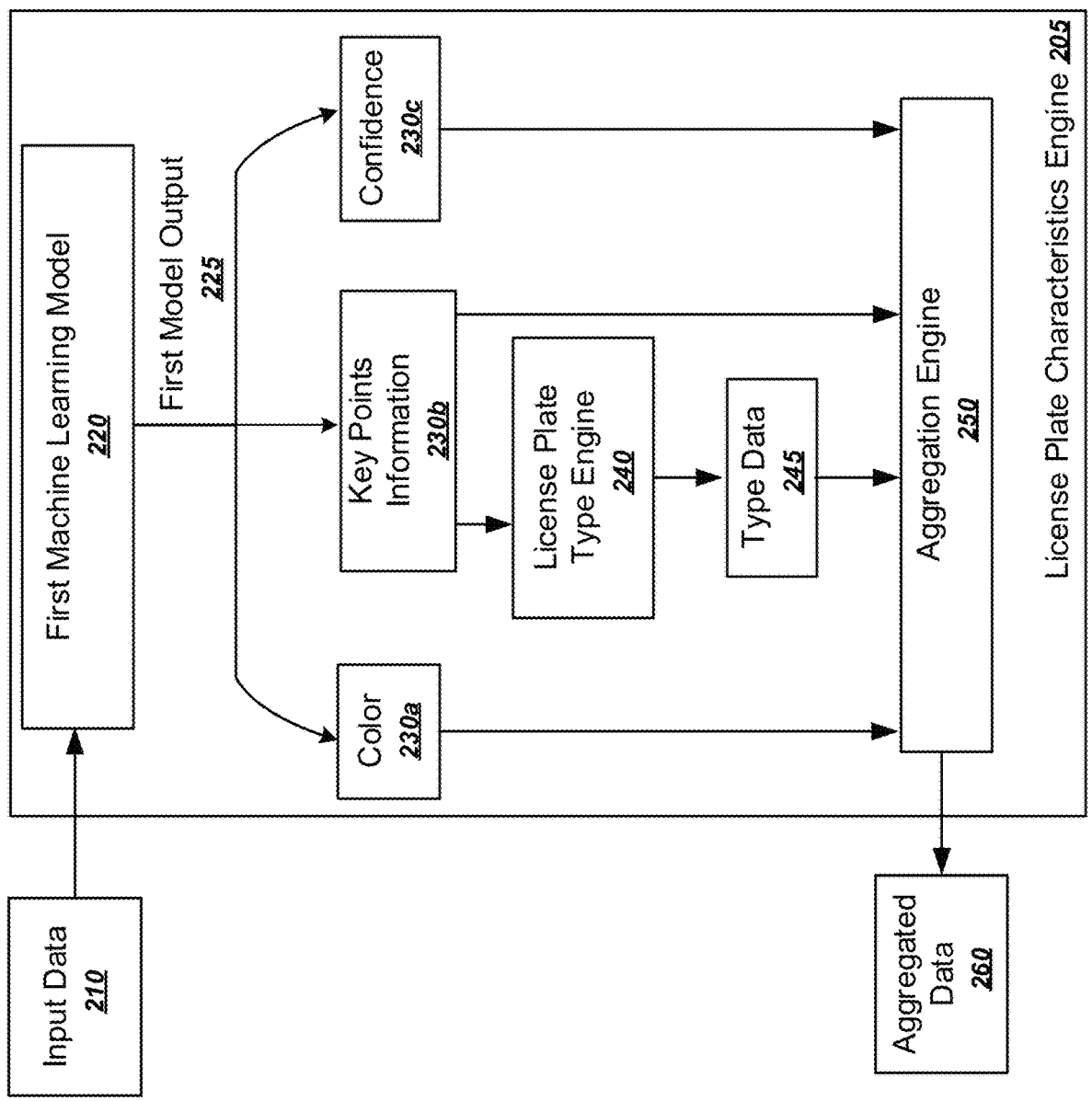

ADAPTIVE TEXT RECOGNITION

BACKGROUND

This specification relates to recognizing textual content, and more particularly, to analyzing image data capturing objects in a scene and recognizing characters of the textual content presented in one or more rows of the captured objects using machine learning models.

For example, the scene can be associated with one or more roads, and the objects captured by image data can include pedestrians, vehicles, vehicle license plates, and road signs. The textual content can include information associated with the objects, e.g., a sequence of characters associated with the vehicle license plate.

Humans can identify objects in an image data and can recognize the textual content of the objects. Alternatively, a system can be configured to process an image data to identify objects in the image data and recognize associated textual content using traditional techniques such as classification and pattern recognition based on Bayesian statistics, to name just a few examples.

Artificial intelligence (AI) is intelligence demonstrated by machines and represents the ability of a computer program or a machine to think and learn. One or more computers can be used to train multiple machine learning models based on training samples, and perform inference operations of each of the multiple trained machine learning models to process model inputs and generate model outputs.

Neural networks belong to a sub-field of machine-learning models. Neural networks can employ one or more layers of nodes representing multiple computations. One or more computers can be configured to perform computations of the neural networks to generate an output, e.g., a classification, a prediction, or a segmentation for a received input. Some neural networks include one or more hidden layers in addition to an output layer. The output of each hidden layer is used as input to the next layer in the network, i.e., the next hidden layer or the output layer. Each layer of the network generates an output from a received input in accordance with the current values of a respective set of network parameters.

SUMMARY

This specification describes techniques for recognizing textual content (e.g., a sequence of characters associated with the textual content) from objects captured in image data, and in particular objects having more than one row of text.

The term "object" throughout this specification refers to any suitable objects captured in image data and having one or more rows of text. For example, the objects can be one or more road signs, billboards, or landmarks each including one or more rows of text. In some situations, the objects can be associated with one or more vehicles (e.g., wagons, bicycles, and motor vehicles), for example, the object can be a sticker or decal attached to a vehicle and having one or more rows of text. As another example, the object can be a license plate affixed to a vehicle.

Recognizing textual content of a vehicle license plate can be implemented for different scenarios, e.g., monitoring vehicle traffic on local roads or highways, improving garage entrance management, monitoring toll charges for vehicles passing over a particular highway or bridge, assisting the criminal investigation, and enhancing social security. License plate recognition can be applied to identify the vehicle information as well as the vehicle owner's information.

Some traditional techniques for license plate recognition are not efficient. For example, some techniques involve considerable human inference such as having one or more personnel review images or videos that include vehicle license plates and recognize the characters for corresponding license plates. As another example, some techniques implement hand-crafted features to analyze an input image or video to obtain license information, e.g., the local binary pattern (LBP) method, the Speeded-up Robust Features (SURF) method, the Scale-invariant Feature Transform (SIFT) method, and the Histogram of Oriented Gradients (HOG) method. These techniques are less efficient compared to a system including one or more machine learning models trained to recognize license plates.

However, some other techniques using machine learning models are not accurate enough. For example, when the input images include different license types (e.g., a single-row type or a multi-row type), traditional techniques can not generate predictions of characters in different types of license plates at a satisfactory accuracy level. Some other techniques design around the problem by using different machine learning models for processing different types of license plates, which can be time-consuming and more computationally expensive.

The techniques described in the following specification aim to solve the above-noted problems faced by traditional techniques. The described techniques relate to recognizing, from input data, different types, for example, of vehicle licenses plates, e.g., single-row or multi-row type license plates (i.e., a license plate type including more than one rows of text), and texts (e.g., sequences of characters) associated with vehicle license plates using one or more machine learning models that are trained end-to-end.

Generally, a method, a system, or one or more computer-readable computer media performing the described techniques can recognize at least a type and text associated with each object in the input data. The input data can be one or more image frames each capturing one or more objects. As described above, each object is associated with at least a text and a particular type, e.g., a vehicle license plate.

The techniques can process image frames using a first machine learning model (e.g., a first deep neural network) to generate a first set of model output. The first set of model output can indicate an existence of a particular object and characteristics associated with the particular object. The characteristics can include, for example, a color of the object, multiple key points associated with the object, and a confidence level of the existence of the object. The color can be a background color of the object. The techniques can further determine a type of the particular object, where the type includes a single-row type and a multi-row type as described above.

After determining the type, the techniques can generate a single-row representation of the object as representation data. The techniques can process the representation data using a second machine learning model (e.g., a second deep neural network) to generate a sequence of characters corresponding to the text associated with the object. The techniques can then process the sequence by determining and removing blank spaces and redundant occurrences in the sequence.

The term "vehicle license plate" throughout the specification refers to a plate attached to a vehicle for official identification purposes. The term "vehicle," as described above, stands for all kinds of vehicles that are navigating on public roads, including motor vehicles such cars, trucks, motorcycles, or tractors. The vehicle license plate for each vehicle includes a sequence of characters (i.e., textual content) that uniquely identifies a vehicle in a jurisdiction where the vehicle license plate is issued. The sequence of characters can have different types and lengths for different jurisdictions. For example, a sequence of characters can be a sing-row, a double-row, or a multiple-row. As another example, the sequence of characters can have a length of one or more characters, e.g., 2, 4, 7, 9, and 12. For simplicity, the term "vehicle license plate" is sometimes referred to as "license plate" in this specification.

The term "characters" corresponding to an identified license plate throughout the specification stands for a text associated with the license plate. The characters can include a number, a letter, a symbolic character for a particular region (e.g., a Chinese character, a Hindi character, an Arabic character, a Japanese character, or a Korean character), and, optionally, symbols (e.g., a dot between characters, an underscore, or a graphic symbol).

The term "machine learning model" throughout the specification stands for any suitable model used for machine learning. As an example, the machine learning model can include one or more neural networks trained for performing different inference tasks. Examples of neural networks and tasks performed by neural networks are described in greater detail at the end of the specification. For simplicity, the term "machine learning models" is sometimes referred to as "neural network models" or "deep neural networks" in the following specification.

Particular embodiments of the subject matter described in this specification can be implemented to realize one or more of the following advantages.

First, the techniques described in this specification can automate the process of identifying a license plate from input data (e.g., an input image or video) and recognizing a sequence of characters that are associated with the license plate. The described techniques are based on one or more machine learning models (e.g., neural networks) and are faster and more accurate in identifying and recognizing license plates than other non-machine learning models.

Second, the techniques described in this specification provide robust and efficient differentiation between different types of license plates. In particular, the described techniques can determine a type for an identified license plate. The license plate type can include a single-row type and a more-than-one-row type. A system performing the described techniques can process input images or videos that capture different types of license plates in respective scenes and determine the respective types for the license plates accurately. In this way, the system does not need to identify and recognize different types of license plates using different models, e.g., a first model trained based on data including only single-row license plates and a second model trained based on data including only double-row license plates.

Moreover, the techniques described in this specification are efficient at training. A system performing the described techniques can include one or more deep neural network models that are integrated in order and are trained end-to-end based on the same sets of training samples, e.g., multiple training images or videos including different types of license plates. The term "end-to-end training" throughout the specification stands for all parameters (e.g., nodal weights in each network layer) that are simultaneously trained or updated during backward propagation under the constraint of a common loss function. The common loss function considers the tasks or accuracy metrics for each of the one or more deep neural networks integrated into the system. Because the one or more deep neural networks are trained end-to-end, the parameters for each of the neural networks are trained (e.g., converged) substantially at the same time. This is advantageous over training two or more neural network models separately using respective loss functions because the training period is shorter and the output accuracy of the trained system is higher.

Furthermore, the techniques described in this specification can be conveniently adapted to process input data from different jurisdictions. In some situations, the system can be trained based on training samples collected for a first jurisdiction or geographic region (e.g., China) and can be used for performing inference operations specified in the trained system to recognize license plates from input data associated with a second jurisdiction or geographic region (e.g., the United States). In some situations, the system can be trained or re-trained based on training samples collected for a third region (e.g., India) and configured to perform inference operations to process input data associated with the third region.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1 illustrates an example system configured to generate output data corresponding to a recognized license plate after processing input data.

FIG. 2A illustrates an example license plate characteristics engine configured to generate aggregated data after processing the input data.

Like reference numbers and designations in the various drawings indicate like elements.

DETAILED DESCRIPTION

Figure 2B:
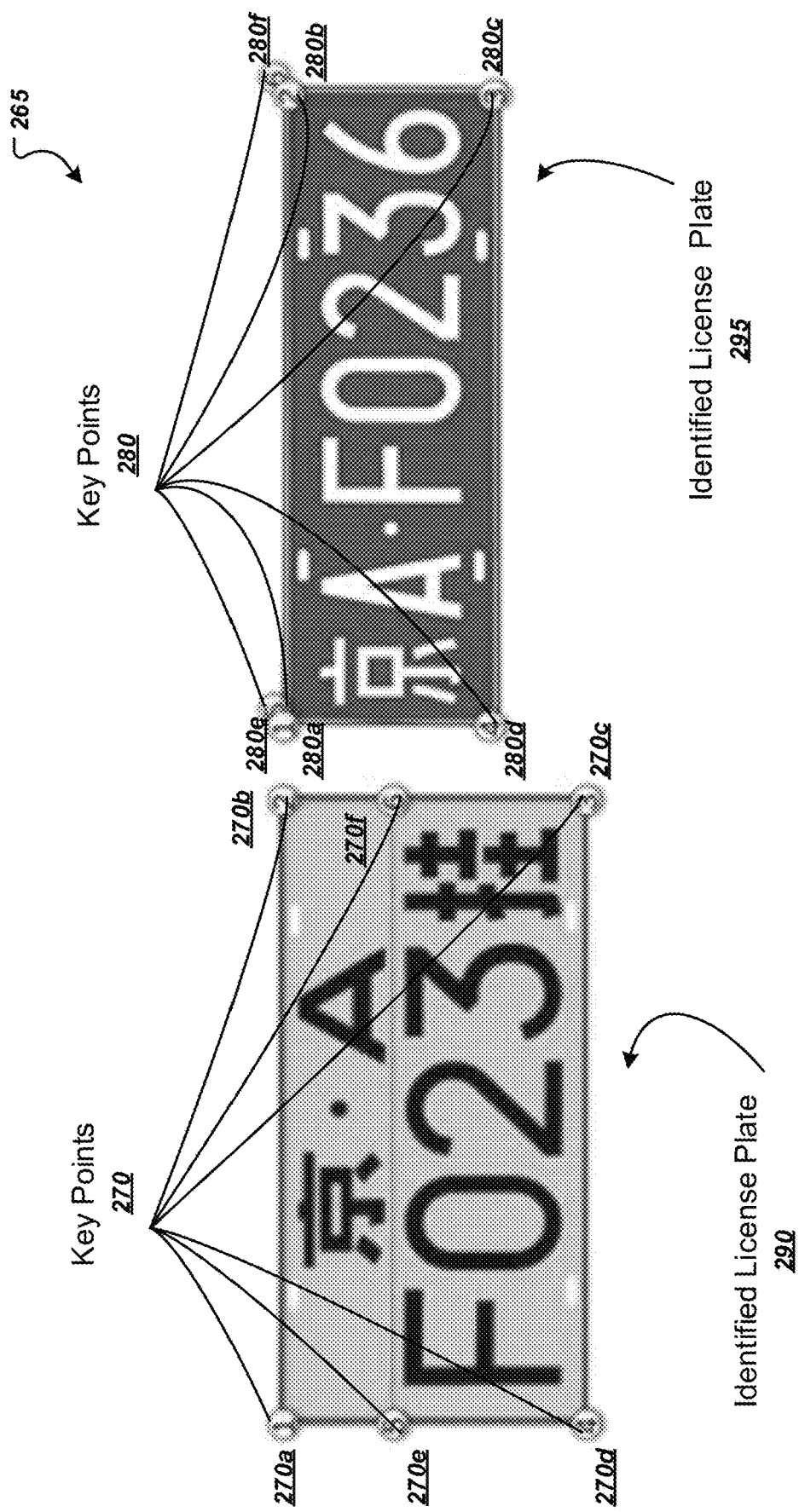
FIG. 2B illustrates example license plates with key points.

FIG. 1 illustrates an example system 100 configured to generate output data 180 corresponding to a recognized license plate after processing input data 110. Although the below specification describes techniques for text recognition in the context of different types of vehicle license plates, it should be appreciated that, as described above, the described techniques can be applied for identifying other objects in image data and recognizing textual content associated with the identified objects. The other objects can be road signs, billboards, landmarks, and stickers attached to one or more motor vehicles having one or more rows of text, to name just a few examples.

In general, the system 100 is configured to identify a license plate from the input data 110 that includes multiple license plates and to recognize one or more characters associated with the identified license plate. The system 100 is an example of a system implemented on one or more computers in one or more locations, in which systems, components, and techniques described below can be implemented. Some of the components of the system 100 can be implemented as computer programs configured to run on the one or more computers.

As shown in FIG. 1, the system 100 can include a license plate processing subsystem 105 that is configured to receive input data 110 and generate output data 180. The system 100 can further include a memory unit 190 communicatively coupled with the license plate processing subsystem 105. The memory unit 190 can provide input data 110 to the license plate processing subsystem 105, and can store output data 180 generated by the license plate processing subsystem 105. For example, the memory unit 190 can receive and store images or videos captured by image sensors, and provide the stored images or videos as the input data 110 to the subsystem 105. In some implementations, the memory unit 190 can be an on-chip memory located on the same chip where the license plate processing subsystem 105 is compiled and deployed. Alternatively, the memory unit 190 can be wirelessly coupled with the license plate processing subsystem 105 and located in a different location.

The system 100 can further include a server 195 that is communicatively coupled with the license plate processing subsystem 105. The server 195 can provide trained or updated neural network parameters to configure one or more deep neural networks in the subsystem 105. The neural network parameters can be stored in the memory 190 and fetched by the subsystem 105 from the memory 190 per cycle or the server 195 can directly provide these parameters to the subsystem 105. In some implementations, the server 195 can fetch output data 180 stored in the memory unit 190 at a particular time interval. Alternatively, the server 195 can directly stream output 180 from the license plate processing subsystem 105. The server 195 can optionally fetch the input images and videos stored in the memory 190 at a particular time interval for further operations.

The input data 110 can be sensor data including one or more image or video frames that capture respective scenes, and each image can include one or more different objects in the captured scenes. For example, the different objects can be vehicles, pedestrians, traffic signs, or traffic lights when the scenes are associated with roads (local roads, highways, and freeways, to name just a few examples). Each frame of the images for these scenes can generally include one or more vehicle license plates. However, in some cases, one or more images or videos in the input data 110 might not include any vehicle license plates.

The license plate processing subsystem 105 can process the input data 110 using one or more engines to identify whether there is a license plate in an image of the input data, determine characteristics of the identified license plate, and generate output data 180 each associated with an identified license plate and representing a sequence of characters recognized for the identified license plate.

The one or more engines in the license plate processing subsystem 105, as shown in FIG. 1, can include a license plate characteristics engine 120, a license plate processing engine 140, and a license plate recognition engine 160.

Among these engines 120, 140, 160, the license plate characterizes engine 120 and the license plate recognition engine 160 each can include a respective machine learning model. For example, the license plate characteristics engine 120 can include a first machine learning model 125, and the license plate recognition engine 160 can include a second machine learning model 165. The first and second machine learning models 125 and 165 can be any machine learning models that are suitable for image processing, classification, and recognition. The examples of machine learning models are described in greater detail below.

The license plate characteristics engine 120, as shown in FIG. 1, can receive input data 110 and process the input data 110 using the first machine learning model 125 to generate a first model output 225 that identifies an existence of a vehicle license plate and specifies characteristics of the identified license plate. The characteristics can include at least a type of the identified license plate, e.g., a single-row type, a double-row type, or a multi-row type. The term "single-row" type represents a type of license plate where the characters in the license plate are arranged in a single row. The term "double-row" type represents a type where the characters are arranged in two rows. The term "multi-row" type represents a type where the characters are arranged in more than one row. The term "multi-row" is also referred to as "more-than-one-row" in this specification. The license plate characteristics engine 120 can further aggregate the model output data to generate aggregated data 130. Further details of the license plate characteristics engine 120 are described in connection with FIG. 2A.

The license plate processing engine 140, as shown in FIG. 1, can receive and process the aggregated data 130 associated with the identified license plate from the license plate characteristics engine 120 to generate representation data 150 of the identified license plate. The representation data 150 can include data specifying adjusted or transformed image pixels representing the identified license plate. For example, the license plate processing engine 140 can generate a single-row representation of a double-row license plate. Further details of generating the representation data 150 are described in connection with FIG. 3B.

The license plate recognition engine 160, as shown in FIG. 1, can receive the representation data 150 from the license plate processing engine 140 and process the representation data 150 using the second machine learning model 165 to generate a second model output. The license plate recognition engine 160 can further process the second model output to determine and remove blank spaces or redundant occurrences from the second model output and generate the output data 180 that includes a sequence of recognized characters corresponding to the identified license plate. The details of generating and processing the second model output are described in connection with FIGS. 5A and 5B.

FIG. 2A illustrates an example license plate characteristics engine 205 configured to generate aggregated data 260 after processing the input data 210. For example, the license plate characteristics engine 205 can be the license plate characteristics engine 120 of FIG. 1, the aggregated data 260 can be the aggregated data 130 of FIG. 1, and the input data 210 can be the input data 110 of FIG. 1.

The first machine learning model 220 can be any trained machine learning model that is suitable for generating a prediction of at least an existence of an object and, optionally, the location of the identified object. For example, the first machine learning model 220 can be trained to receive and process each of the input data 210 through operations specified in the first machine learning model 220 to generate a first model output 225. The input data 210 can be frames of images or videos captured by image sensors. The first model output 225 can include data that at least identifies whether there is a vehicle license plate captured in the input image or the frame of the input video, and, optionally, the pixel-wise location of an identified license plate (e.g., a bounding box in the input image that includes pixels representing the identified license.

In some implementations, the identification of whether a license plate exists in an input image is based on a prediction of a likelihood of one or more pixels being included in the frame of the image that represents a license plate.

The first machine learning model 220 can further crop out the pixels that include the identified license plate and process the cropped image to rectify the identified license plate using computer vision techniques. The rectified image can be used by the license plate characteristics engine 205 for further operations, e.g., generating predictions of characteristics of the identified license plate.

The first machine learning model 220 can be trained through the supervised learning method to process training samples (e.g., training images or videos including one or more license plates in different scenes) and generate model outputs. The training process can be end-to-end training with other machine learning models in the system 100. The training samples are each labeled with ground-truth information including, for example, the existence of a license plate, a color for a license plate, and key points and their locations in a license plate.

The term "color" for a license plate can represent different colors associated with the license plate. The color of a license plate can include one or more background colors of the license plate, and one or more colors of the textual content (e.g., one or more rows of text or other symbolic characters) associated with the license plate. The background color and text color for the license plate can be the same or different colors.

The term "key points" for a license plate used throughout the specification can represent one or more particular points in the license plate. The one or more particular points can include vertices of a license plate, or points that define different regions in a license plate, or both. For example, a first set of points can be vertices defining a first region of a license plate, and a second set of points can be vertices defining a second region of the license plate. The key points are further used to determine a type of license plate (e.g., a single-row type or a multi-row type), which is described in more detail below. The total number of key points can vary, depending on the recognition tasks. For example, the key points can include 4, 6, 8, 10, or 20 points.

In some implementations, the key points can also be represented by one or more pixels corresponding to the vertices of a license plate that is represented by multiple pixels in an image frame. One or more pixels in a training sample can be labeled as key points to train the first machine learning model 220 to predict key points information 230b for the input data 210.

The training process is to minimize a training loss that defines discrepancies between the ground truth results represented by the labeled training samples and the predictions generated by the first machine learning model 220. The parameters in the first machine learning model 220 are updated through backward propagation while minimizing the training loss. The training process can include one or more of the following techniques, e.g., batch normalization, dropout, rectified linear units, or early stopping, to name just a few examples. The first machine learning model 220 can be trained further using bootstrapping to obtain estimates of the mean and variance for each prediction (e.g., pixel-wise locations of the key points) which allows the first machine learning model 220 to incorporate uncertainty into the predictions of the key points so that the first machine learning model 220 can operate in a more stable manner.

Referring back to FIG. 2A, the first model output 225 can further include predictions of characteristics of a license plate in response to determining that there is a license plate captured in the image frame. The characteristics of the identified license plate can include a prediction for a color 230a (e.g., a background color) of the identified license plate. As described above, the predicted background color can be red, yellow, blue, black, or white, to name just a few examples. For simplicity, the term "color" in the following specification refers to a background color of a license plate, if not particularly indicated. The characteristics of the identified license plate can further include key points information 230b for the license plate. The key points information 230b can include a total number of key points associated with the license plate and pixel-wise locations of the key points with respect to the input image.

The license plate type engine 240 can process the key points information 230b as input and generate type data 245 including a prediction of a type for the identified license plate. The details of processing the key points information 230b by the license plate type engine 240 are described in connection with FIG. 3A.

In some implementations, the characteristics associated with the identified license plate can further include a confidence level 230c to avoid false-positive errors. In particular, the first machine learning model 220 is configured to associate a prediction of the identified license plate with a confidence level 230c. The confidence level throughout the specification can be a real number representing a likelihood of a prediction to be true. The higher the confidence level, the more accurate the prediction. For example, the existence of the identified license plate can be associated with a first confidence level, which represents how likely the predicted probability of an existence of the identified license plate is true and can be trusted. As another example, the color of the identified license plate can be associated with a second confidence level, indicating how likely the predicted color is true. Similarly, each of the key points of the identified license plate can be associated with a respective confidence level. The confidence level throughout the specification can have a range from 0% to 100%, e.g., 80%, 90%, or 95%.

The machine learning model 220 can be provided a pre-set confidence threshold value, e.g., 90%, and determine that a prediction associated with a confidence level that is smaller than the threshold value to be false-positive and reject such a prediction. For example, if a confidence level associated with a prediction of a license plate being in the input frame is 85%, which is less than the pre-set threshold of 90%, the first machine learning model 220 rejects the prediction and determines there is no license plate in the input frame.

In some implementations, the first machine learning model 220 can be a trained deep neural network that includes multiple network layers specifying operations for different tasks. For example, a first group of network layers of the deep neural network can be configured to output a cropped image based on a bounding box for the license plate after identifying a license plate in an input image. The deep neural network can further process the cropped image representing the license plate to output characteristics of the identified license plate, e.g., color, key points, and a type of the identified license plate.

After generating characteristics of the identified license plate, the aggregation engine 250 can concatenate at least the above-noted predictions (e.g., predictions of color 230a, key points information 230b, confidence level 230c, and type data 245) to generate aggregated data 260. The aggregated data 260 can include any suitable data structure to group up the above-noted predictions. For example, the aggregated data 260 can be a tensor, a linked list, or a hash table. The aggregation engine 250 can determine the size of the data structure when concatenating the predictions, and, optionally, respective memory locations for storing the aggregated data 260 for further operations.

FIG. 2B illustrates example license plates 290 and 295 with key points 270 and 280.

As shown in FIG. 2B, the identified license plate 290 is a double-row license plate because it has characters aligned in two rows, and an identified license plate 295 is a single-row license plate as the characters associated with the plate are aligned in a single row. Although the example license plates shown in FIG. 2B are a sing-row type and a double-row type, it should be appreciated that the described techniques can be applied to identify and recognize license plates of other types in an issuing region, e.g., a third-row type or a multi-row type having characters aligned in rows greater than two.

Referring back to the identified license plates 290 and 295 and in connection with the description above, the license plate characteristics engine 205 can apply the first machine learning model 220 to identify a license plate, and crop out an image having pixels representing the license plate based on the predicted locations for the license plate in an input image frame. In some situations, the cropped image can include substantially only the pixels representing the identified license plate. For example, the identified license plate 290 is represented by pixels in a first cropped image from a first input frame and the identified license plate 295 is represented by pixels in a second cropped image from a second input frame.

The first model output 225 generated by the first machine learning model 220 can include key points information 230b associated with an identified license plate. The first machine learning model 220 can be trained with training samples that include frames of images each labeled with multiple key points and configured to process an input image frame to generate key points information 230b.

As described above, the key point information 230b can include a respective number of key points and locations associated with the key points for an identified license plate. For example, the total number of key points 270 for the identified license plate 290 can include six different key points 270a-f. As another example, the total number of key points 280 for the identified license plate 295 can include six different key points 280a-f. Although there are six key points for each license plate 290 and 295 as shown in FIG. 2B, it should be appreciated that other numbers of key points are possible, for example, 8, 10, 12, and 20.

Each of the key points 270a-f and 280a-f are associated with a pixel-wise location or coordinates with respect to the original input image frame or the cropped image for a particular license plate. In some situations, the pixel-wise locations are converted to real sizes based on at least the sensor positions, sensor characteristics, and pixel sizes. However, it should be appreciated that any suitable coordinate frames can be used to represent pixel-wise locations or coordinates of the key points.

Figure 3A:
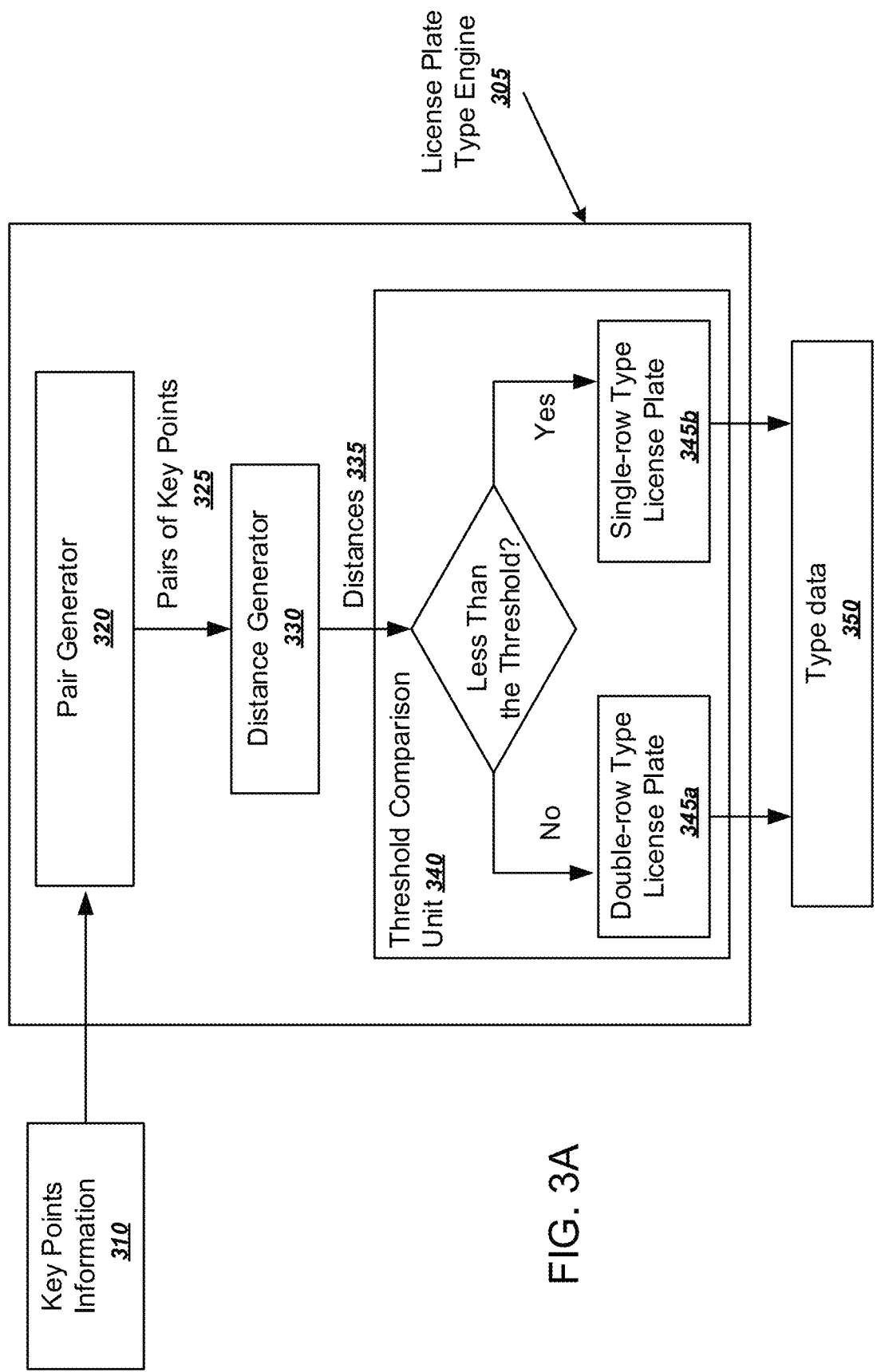
FIG. 3A illustrates an example license plate type engine configured to determine a type of license plate.

FIG. 3A illustrates an example license plate type engine 305 configured to determine a type of license plate. The license plate type engine 305 of FIG. 3A can be equivalent to the license plate type engine 240 of FIG. 2A.

The license plate type engine 305 can receive the key points information 310, which is equivalent to the key point information 230b of FIG. 2A, and generate multiple pairs of key points using a pair generator 320. The multiple pairs of key points are generated based on, for example, the relative positions of the key points. For example, a first pair can include a first key point located at the top-left vertex of the license plate and a second key point located substantially on the left edge and below the first key point. As another example, a second pair can include a third key point located on the top-right vertex and a fourth key point on the right edge and below the third key point.

In some implementations, the pair generator 320 can pair up all key points of interest for further analysis. For example and referring back to the identified license plate 290 shown in FIG. 2B, the pair generator 320 can generate a first key point pair of key points 270a and 270e, and a second key point pair of key points 270d and 270f. As another example and referring back to the identified license plate 295, the pair generator 320 can generate a first key point pair of key points 280a and 280e, and a second key point pair of key points 280d and 280f. It should be noted there can be other possible key point pairs for an identified license plate, e.g., a pair of key points 270a and 270d, 270a and 270b, 270e and 270d, 270e and 270f for the plate 290, to name just a few examples.

The distance generator 330 can receive the pairs of key points 325 from the pair generator 320 and generate distances 335 for each of the pairs. The distance between a pair of key points can be any one of suitable distances, e.g., a Euclidean distance, a Euclidean distance in a rectified image of the identified license plate, or a distance in a particular direction (e.g., a direction along a first edge). In some implementations, the distance can be a pixel-wise distance, e.g., a number of pixels between a pair of key points. For example, the distance can be 5 pixels, 10 pixels, 20 pixels, or more.

In connection with the identified license plate 290 shown in FIG. 2B, the distance generator 330 can determine a first distance between a first pair of key points (e.g., key points 270a and 270e), and a second distance between a second pair of key points (e.g., key points 270d and 270f). Similarly, as another example and in connection with the identified license plate 295 shown in the FIG. 2B, the distance generator 330 can determine a first distance between a first pair of key points (e.g., key points 280a and 280e), and a second distance between a second pair of key points (e.g., key points 280b and 280f).

The license plate type engine 305 can further include a threshold comparison unit 340 configured to determine a type for an identified license plate. To determine, the threshold comparison unit 340 can compare distances of one or more key-point pairs against a pre-set threshold distance. For example, the threshold comparison unit 340 can compare the first and second distances associated with the identified license plate 290 with a threshold distance. If both the first and second distances are equal to or greater than the threshold distance, the threshold comparison unit 340 can determine that the identified license plate 290 is a double-row type license plate 345a, otherwise, a single-row license plate. As another example, after comparing the first and second distances associated with the identified license plate 295 with the threshold distance, the threshold comparison unit 340 can determine that the identified license plate 295 is a single-row type license plate 345*b* if both the first and second distances are smaller than the threshold distance. Alternatively, the threshold comparison unit 340 can determine a license plate to be a double-row type as long as there is one pair of key points having a distance greater than or equal to the threshold distance.

The threshold distance can vary based on the requirements for the recognition tasks. As described above, the threshold distance can be a pixel-wise distance. The threshold value can be determined based on a pixel-wise size of a license plate for efficiency. For example, assuming a height of a vehicle plate captured in an image is 40 pixels, the threshold distance can then be determined to be 10 pixels. As another example, the threshold distance can be a fraction of a pixel-wise height or width of a license plate captured in an image, e.g., 10%, 25%, or 50% of a pixel-wise height of a license plate. In some implementations, the threshold distance can be determined based on the real size of a license plate. For example, the threshold distance can range between 1 cm and 5 cm.

The license plate type engine 305 can generate as output the type data 350 specifying the license plate type for the identified license plate. The system 100 can perform additional operations based on the type data 350.

Figure 3B:
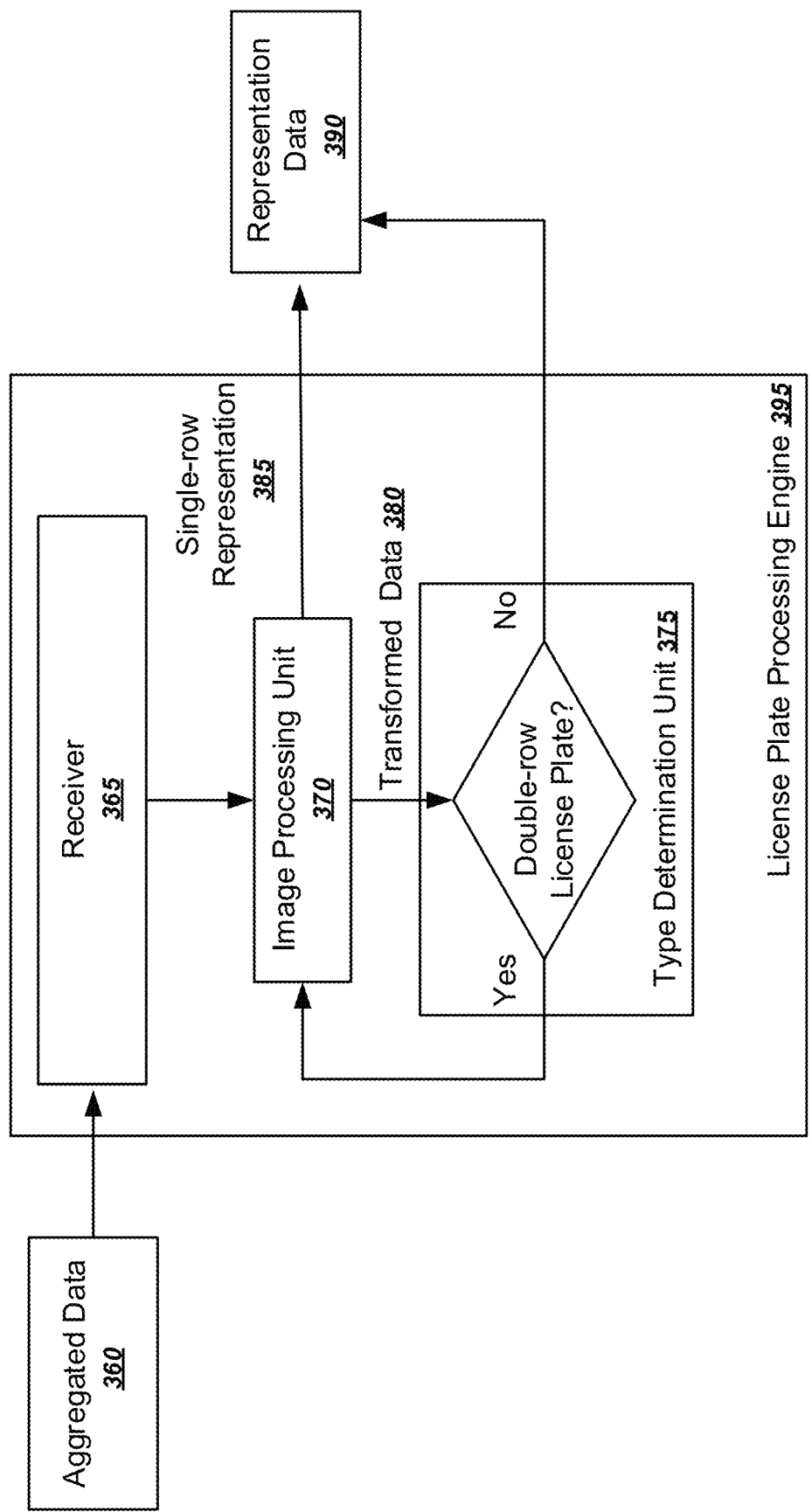
FIG. 3B illustrates an example license plate processing engine configured to generate representation data after processing the aggregated data.

FIG. 3B illustrates an example license plate processing engine 355 configured to generate representation data 390 after processing the aggregated data 360. The license plate processing engine 395 of FIG. 3B can be equivalent to the license plate processing engine 140 of FIG. 1.

As shown in FIG. 3B, the license plate processing engine 395 can process the input aggregated data 360 and generate representation data 390 for further operations.

The receiver 365 can receive the aggregated data 360, the aggregated data 360, for example, can be the aggregated data 260 of FIG. 2A or the aggregated data 130 of FIG. 1. The aggregated data 360 can include the characteristics predicted by the system 100 for an identified license plate. The receiver 365 can optionally receive data representing the cropped image that includes the identified license plate.

The image processing unit 370 can process data received by the receiver 365 using image process techniques to generate transformed data 380. The transformed data 380 are generally useful because the original image representing the identified license plate can be captured in the input image frame from a particular view, which might not face front and can reduce the accuracy for recognizing the characters of the license plate. The transformed data 380 can be a transformed front view version of the cropped images.

To generate the transformed data 380, the image processing unit 370 can perform homographic transformations for the cropped images representing identified license plates using the key points information. Homographic transformation of images generally relates to projective transformation between one or more related images. Although one or more license plates can be captured from different views in the image frame, the alignment of all the license plates (e.g., alignment of key points in the license plates) in the image frame can be related or substantially similar to each other. The image processing unit 370 can transform each license plate image captured from a different view into a common pre-determined view (e.g., a front view) based on the alignment, e.g., key points aligned in the top-left region of the license plates.

For example, the image processing unit 370 can rescale an image representing a license plate to a different size of pixels, e.g., from 20 by 20 pixels to 500 by 500 pixels. As another example, the image processing unit 370 can translate the image by one or more pixels or rotate the image around an axis by a certain angular degree, e.g., translating all pixels of the image by 10 pixels along a horizontal direction and rotating all pixels around an axis perpendicular to a central pixel of the image by 30 degrees clockwise.

The license plate processing engine 395 can further include a type determination unit 375 configured to determine whether the identified license plate is predicted to be a multi-row type license plate or a single-row type license plate based on the aggregated data 360.

In response to determining that the identified license plate is a multi-row type license plate (e.g., a double-type license plate), the license plate processing engine 395 can process the image representing the license plate using the image processing unit 370 to generate a single-row representation 385 of the license plate and provide the single-row representation 385 as the representation data 390 for character recognition by the system 100.

Generating the single-row representation of a double-row type or multi-row type license plate can improve the accuracy of recognizing characters associated with the license plate when the input data includes different types of license plates for recognition. The details of generating the sing-row representation of a double-row license place are described in connection with FIG. 4.

In response to determining that the identified license plate is a single-row type license plate, the license plate processing engine 395 can provide the transformed data 380 as the representation data 390 for the performing additional operations by the system 100.

Figure 4:
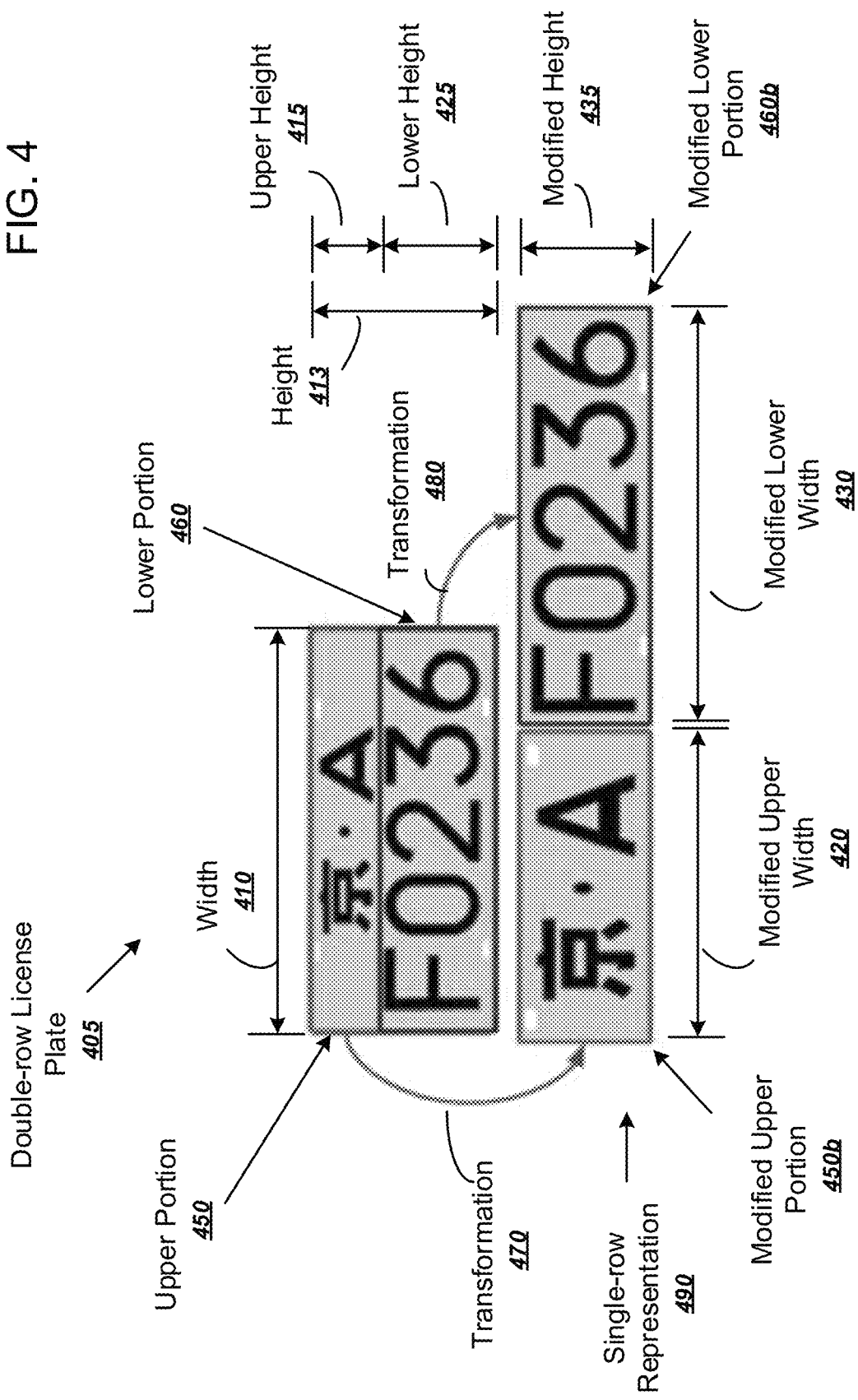
FIG. 4 illustrates an example single-row representation of a double-row type license plate.

FIG. 4 illustrates an example single-row representation 490 of a double-row type license plate 405.

As shown in FIG. 4, the double-row type license plate 405 represented by the transformed data 380 can include a width 410 and a height 413.

The license plate processing engine 395 can process the plate 405 by determining an upper portion 450 and a lower portion 460 of the double-row license plate. The license plate processing engine 395 can further determine an upper height 415 and a lower height 425 for the upper and lower portions, respectively.

Generally, the license processing engine 395 can determine different regions based on identified key points information. As described above, the system 100 can determine a first region (e.g., the upper portion 450) of a license plate based on a first set of key points, and determine a second region (e.g., the lower portion 460) of the license plate based on a second set of key points. The system can crop the image representing the double-row license plate into the first and second regions based on key points that overlap in the first and second sets of key points.

The license plate processing engine 395 can crop the upper and lower portions from the double-row type license plate 405, and perform image process techniques to transform the upper and lower portions. For example and as shown in FIG. 4, the lower portion 460 can be transformed, by the license plate processing engine 395, to a modified lower portion 460*b*, and the upper portion 450 can be transformed to a modified upper portion 450*b*. In some implementations, the license plate processing engine 395 can change at least one of a height or a width for the upper and lower portions during the transformation step 470 or 480 respectively.

For example, the modified lower portion 460b can have a modified height 435 different from the lower height 425, and a modified lower width different from the width 410. As another example, the modified upper portion 450b can have the modified height 435 to substantially align with the modified lower portion 460b, and a modified upper width 420 different from the width 410.

Generally, the license plate processing engine 395 does not have to modify all the widths and heights of the upper and lower portions during the transformation, as long as at least the heights for the modified upper and lower portions can be substantially the same for alignment. For example, the license plate processing engine 395 can keep the lower portion unchanged and only modify the upper height of the upper portion to the same as the lower height.

The license plate processing engine 395 can concatenate the modified upper portion with the modified lower portion to generate a single-row representation 490 as shown in FIG. 4.

Figure 5:
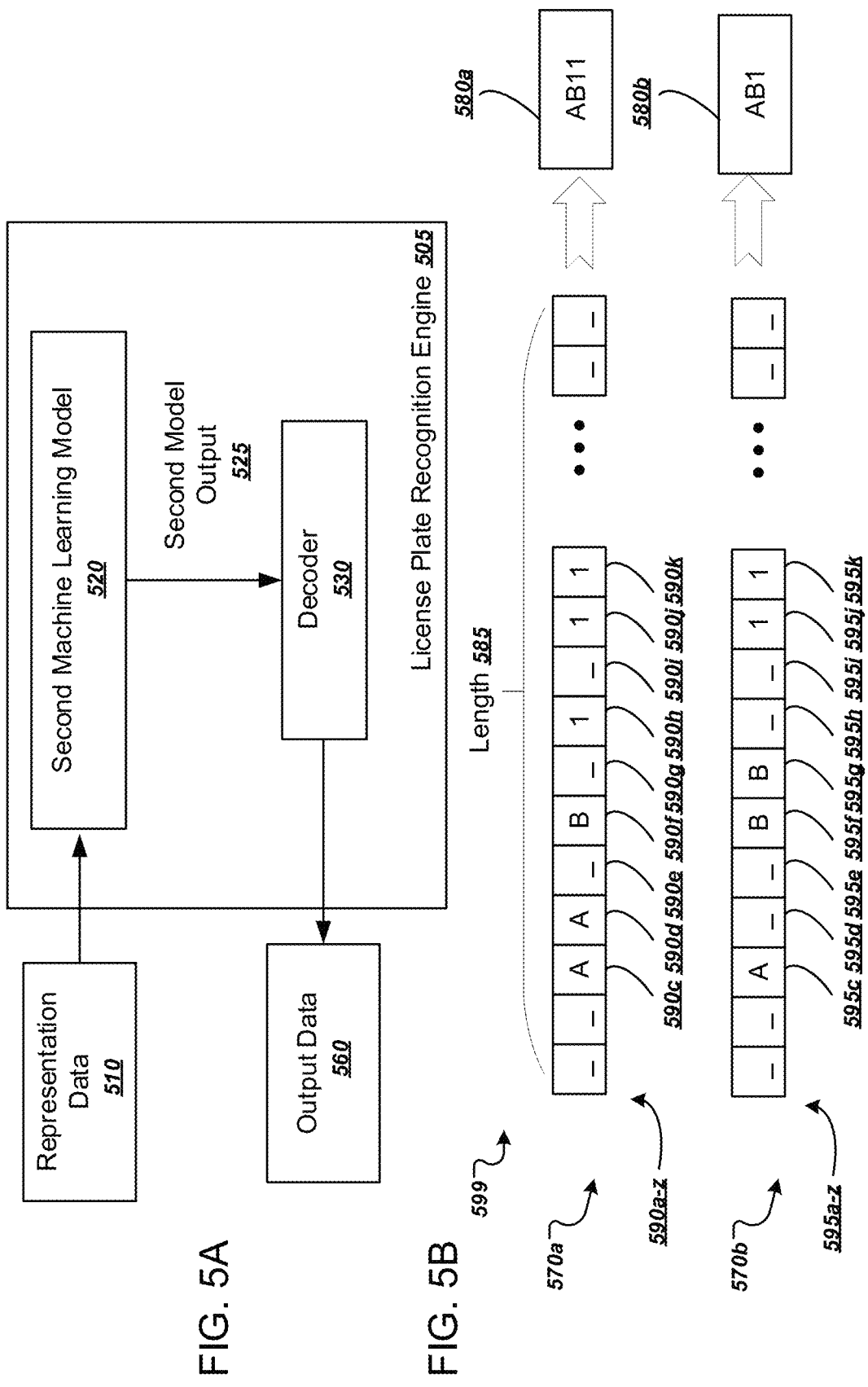
FIG. 5A illustrates an example license plate recognition engine configured to process representation data to generate output data corresponding to a recognized license plate.
FIG. 5B illustrates an example process of generating output data using the example decoder of FIG. 5A.

FIG. 5A illustrates an example license plate recognition engine 505 configured to process representation data 510 to generate output data 560 corresponding to a recognized license plate. For example, the license plate recognition engine 505 of FIG. 5A can be similar to or the same as license plate recognition engine 160 of FIG. 1.

As shown in FIG. 5A, the license plate recognition engine 505 can receive as input the representation data 510. The representation data 510 can be, for example, the representation data 390 shown in FIG. 3B or the representation data 150 shown in FIG. 1.

The second machine learning model 520 can be any suitable machine learning model that is based on a connectionist-temporal classification (CTC) method (e.g., a CTC score or a CTC loss function). The CTC method is an alternative approach to Hidden Markov Model for constructing a recurrent neural network model such as Long Short Term Memory (LSTM) networks. The CTC score or loss function is independent of the underlying neural network structure, which can be applied to different machine learning models for processing text. In some implementations, the second machine learning model can include a neural network model configured for recognizing a sequence of characters of a license plate.

The second machine learning model 520 can be trained, using end-to-end training techniques similar to those described above, by processing training samples with known sequences of characters from multiple input images or videos. The second machine learning model 520 can update model parameters when minimizing the CTC loss function. For example, when the second machine learning model 520 is a neural network model, the network parameters can be updated during backward propagation.

The trained second machine learning model 520 can process the input image (e.g., the representation data 550) and generate the second model output 525 by encoding the characters in the input image. The second machine learning model can encode the input image representing a sequence of characters and generate a sequence of characters that include duplicated characters. The second machine learning model 520 can differentiate the redundant characters and non-redundant characters using blank space symbols denoted as an underscore symbol "_" throughout the specification. For example, a character adjacent to a blank space symbol on each side in a sequence is determined to be a non-redundant character. As another example, two identical and consecutively positioned characters can be determined to have at least one redundant character.

Optionally, the second machine learning model 520 can determine a "null" character predicted in a position of the model output and use the blank space symbol "_" to represent the "null" character. The term "null" character in this specification represents situations where there are not any "characters" in a particular position of the output sequence, e.g., the position corresponds to a "space" in the text associated with the license plate.

Decoding duplicated characters in model outputs is useful because a single character can span multiple horizontal positions of a sequence represented in the input image, and some other techniques might predict the output with multiple duplicates of the single character and cannot correctly distinguish between a prediction of a true character and a duplicated character. For example, some techniques might predict a word to be "to" when the ground truth word shown in the input is "too" by mistakenly determining the second "o" of the "too" to be redundant.

The decoder 530 can decode the second model output 525 by determining the duplicated characters and blank spaces in the sequence of predicted characters and removing the duplicates and black spaces from the second model output 525 to generate a sequence of characters corresponding to the identified license plate, i.e., the output data 560. The details of the decoding process are described in connection with FIG. 5B.

FIG. 5B illustrates an example process 599 of generating output data 560 using the decoder 530 of FIG. 5A. For convenience, the example process 599 is described as being performed by a system of one or more computers located in one or more locations. For example, the license plate recognition engine 505 of FIG. 5A, the license plate recognition engine 160 of FIG. 1, or the system 100 of FIG. 1, when appropriately programmed, can perform the process 500.

As shown in FIG. 5B, the second machine learning model 520 can generate example second model output 570a or 570b that includes a sequence of characters using the CTC encoding techniques. Each model outputs 570a or 570b can include a predetermined length 585, e.g., a number of positions in the sequence of characters included in the second model output 525. The length can be 5, 10, 20, and 50, depending on the particular recognition requirements. The length can be pre-set before or when training the second machine learning model 520. Because the second machine learning model 520 decodes the redundant characters and "null" characters using blank spaces, the second model output 570a or 507b can include recognized sequences of characters of various sizes less than or equal to the predetermined length 585.

Each of the predicted sequences (i.e., the second model outputs 570a, 507b for processing a respective input) can include multiple positions 590a-z or 595a-z, each position can represent a predicted character or a blank space associated with an identified license plate. For example, the positions 590c-k represents a sequence of "AA_B_1_11," and the positions 595c-k represents a sequence of "A__BB__11." The sequences 570a and 570b can include one or more blank spaces at the beginning of the sequence or at the end of the sequence, or both.

The decoder 530 can determine one or more blank spaces and redundant characters from the second model outputs (e.g., sequences 570a and 570b). In some implementations, the decoder 530 can determine two or more recognized characters to be duplicate if they are the same character and positioned abutting each other without blank spaces. For example, the decoder 520 can determine one of the two "A"s in the positions 590c and 590d of the sequence 570a are redundant, and one of the two "1"s in the positions 590*j* and 590*k* are redundant because the two "A"s and two "1"s are abutting each other without one or more blank spaces between them. Similarly, the decoder 530 can determine that one of the two "B"s in positions 595*f* and 595*g* of the sequence 570*b* are redundant. Therefore, the decoder 520 can remove the blank spaces and redundant characters and generate the output data 580*a* for the second model output 570*a* to be "AB11," and generated the output data 580*b* for the second model output 570*b* to be "AB 1." It should be appreciated that the decoder 530 can process the sequence of characters in configurations different from the sequences 570*a* and 570*b* shown in FIG. 5B.

Figure 6:
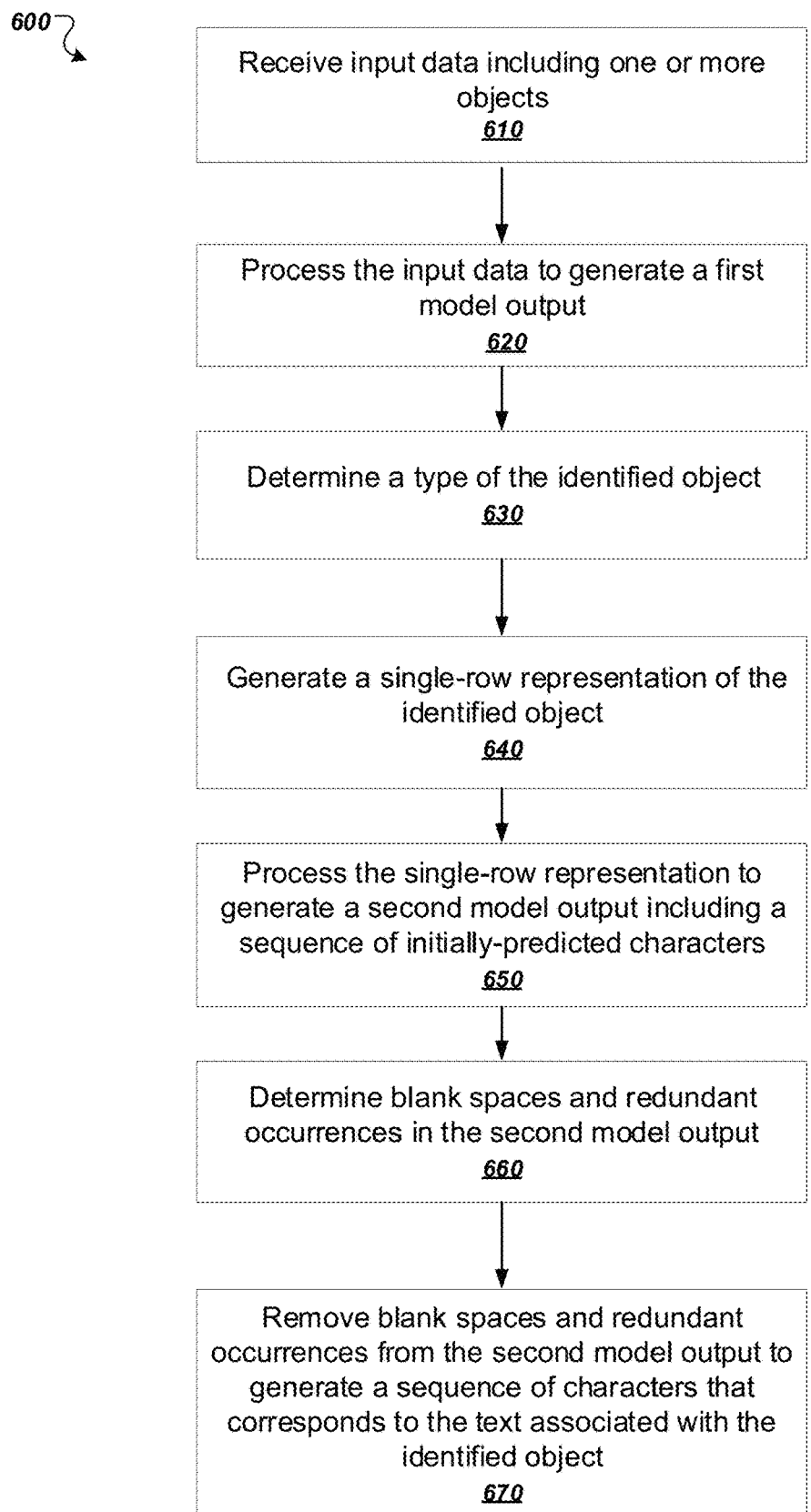
FIG. 6 is a flow diagram of an example process of generating output data corresponding to an object recognized from input data.

FIG. 6 is a flow diagram of an example process 600 of generating output data corresponding to an object recognized from input data. For convenience, the example process 600 is described as being performed by a system of one or more computers located in one or more locations. For example, the system 100 of FIG. 1, when appropriately programmed, can perform the process 600.

The system can receive input data including one or more objects (610). As described above, the system can include a first machine learning model trained to process the input data. The input data can include one or more images or videos collected by one or more image sensors. The input data can capture one or more scenes with one or more objects each associated with at least a text and a particular type. In some implementations, the one or more objects can include one or more vehicle license plates.

The system can process the input data to generate a first model output (620). More specifically, the first machine learning model can generate a first model output by processing the input images or videos that include one or more objects. The first model output can include data that at least identifies an existence of a particular object in the input data. In some implementations, the first model output can also include a cropped image representing the identified object from an original input image frame.

In situations where the first model output indicates a particular object in the input image, the first machine learning model can further generate predictions associated with the first model output that specify characteristics of the identified object. The characteristics can include at least one of: a background color detected for the object, key points information associated with the identified object, or a confidence level associated with predictions for the object.

The system can determine a type of the particular object based on the characteristics (630). More specifically, the system can be configured to determine a type for an identified object based at least on the key points information. The type can include a single-row type and a multi-row type. The identified object can be a single-row type with a single row of text or a multi-row type with more than one row of text.

The system can generate multiple pairs of key points and compute a distance for each pair of the multiple pairs of key points. The system can compare the distances with a predetermined threshold distance. Based on the comparison, the system can determine whether the identified object is a single-row type or double-row type. Suppose the calculated distances satisfy (e.g., greater than or equal to) the threshold value. In that case, the system can determine that a corresponding object is a double-row type; otherwise, a single-row type.

The system can generate a single-row representation of the particular object as representation data based on data specifying the particular object (640). The system can include an image processing unit configured to perform homographic transformation for a cropped image representing a corresponding object, and generate transformed data representing the cropped image from a different perspective, e.g., a front view. As described above, the system can determine whether the corresponding object is a double-row type license plate. In response to determining that the corresponding object is a double-row type, the image processing unit can further process transformed data to generate a single-row representation of the object and provide the single-row representation as representation data for further operations. In response to determining that the corresponding object is a single-row type, the system can directly provide the transformed data as the representation data for the single-row type object. It should be appreciated that generating single-row representations for corresponding multi-row type (e.g., double-row type) objects can improve the accuracy when the system applies the same machine learning model to recognize characters that correspond to different types of objects.

The system can process the representation data to generate a second model output (650). More specifically, the system can include a second machine learning model trained end-to-end with the first machine learning model as described above. The second machine learning model is configured to process representation data (e.g., the single-row representation for a double-row type object) and generate a second model output. The second model output can include a sequence of initially-predicted characters that correspond to a text associated with the particular object. It is noted that the second machine learning model is based on CTC scores or loss functions and can encode input representation data to identify blank spaces or redundant characters. Therefore, the second model output can have one or more blank spaces or redundant characters in the sequence of predicted characters.

The system can determine whether one or more blank spaces or one or more redundant occurrences exist in the second model output (660). As described above, the system can determine that at least one of two consecutively positioned same characters to be a redundant occurrence and can determine a character to be non-redundant if each side of the character is adjacent to a blank space symbol in the sequence. The system can determine the total number of blank spaces or redundant occurrences using one or more counters. For example, in a fixed-length second model output of 20 positions, the system can determine 5 blank spaces and 10 redundant characters.

In response to determining that one or more blank spaces or one or more redundant occurrences exist in the second model output, the system can remove the one or more blank spaces or the one or more redundant occurrences from the second model output to generate a sequence of predicted characters that correspond to the text associated with the particular object (670). The generated sequences of characters without blank spaces and redundant occurrences, as described above, are the output data generated by the system.

The term "first machine learning model" and the term "second machine learning model" throughout the specification can be neural network models suitable for the tasks described in this specification. Depending on the task, a neural network can be configured, i.e., through training, to receive any kind of digital data input and to generate any kind of score, classification, or regression output based on the input.

In some cases, the neural network is a neural network that is configured to perform an image processing task, i.e., receive an input image and process the input image to generate a network output for the input image. In this specification, processing an input image refers to processing the intensity values of the pixels of the image using a neural network. For example, the task may be image classification and the output generated by the neural network for a given image may be scores for each of a set of object categories, with each score representing an estimated likelihood that the image contains an image of an object belonging to the category. As another example, the task can be image embedding generation and the output generated by the neural network can be a numeric embedding of the input image. As yet another example, the task can be object detection and the output generated by the neural network can identify locations in the input image at which particular types of objects are depicted. As yet another example, the task can be image segmentation and the output generated by the neural network can assign each pixel of the input image to a category from a set of categories.

As another example, if the inputs to the neural network are Internet resources (e.g., web pages), documents, or portions of documents or features extracted from Internet resources, documents, or portions of documents, the task can be to classify the resource or document, i.e., the output generated by the neural network for a given Internet resource, document, or portion of a document may be a score for each of a set of topics, with each score representing an estimated likelihood that the Internet resource, document, or document portion is about the topic.

As another example, if the inputs to the neural network are features of an impression context for a particular advertisement, the output generated by the neural network may be a score that represents an estimated likelihood that the particular advertisement will be clicked on.

As another example, if the inputs to the neural network are features of a personalized recommendation for a user, e.g., features characterizing the context for the recommendation, e.g., features characterizing previous actions taken by the user, the output generated by the neural network may be a score for each of a set of content items, with each score representing an estimated likelihood that the user will respond favorably to being recommended the content item.

As another example, if the input to the neural network is a sequence of text in one language, the output generated by the neural network may be a score for each of a set of pieces of text in another language, with each score representing an estimated likelihood that the piece of text in the other language is a proper translation of the input text into the other language.

As another example, the task may be an audio processing task. For example, if the input to the neural network is a sequence representing a spoken utterance, the output generated by the neural network may be a score for each of a set of pieces of text, each score representing an estimated likelihood that the piece of text is the correct transcript for the utterance.

As another example, the task may be a keyword spotting task where, if the input to the neural network is a sequence representing a spoken utterance, the output generated by the neural network can indicate whether a particular word or phrase ("hotword") was spoken in the utterance. As another example, if the input to the neural network is a sequence representing a spoken utterance, the output generated by the neural network can identify the natural language in which the utterance was spoken.

As another example, the task can be a natural language processing or understanding task, e.g., an entailment task, a paraphrasing task, a textual similarity task, a sentiment task, a sentence completion task, a grammaticality task, and so on, that operates on a sequence of text in some natural language.

As another example, the task can be a text to a speech task, where the input is text in a natural language or features of the text in a natural language and the network output is a spectrogram or other data defining audio of the text being spoken in the natural language.

As another example, the task can be a health prediction task, where the input is electronic health record data for a patient and the output is a prediction that is relevant to the future health of the patient, e.g., a predicted treatment that should be prescribed to the patient, the likelihood that an adverse health event will occur to the patient, or a predicted diagnosis for the patient.

As another example, the task can be an agent control task, where the input is an observation characterizing the state of an environment and the output defines an action to be performed by the agent in response to the observation. The agent can be, e.g., a real-world or simulated robot, a control system for an industrial facility, or a control system that controls a different kind of agent.

As another example, the task can be a genomics task, where the input is a sequence representing a fragment of a DNA sequence or other molecule sequence and the output is either an embedding of the fragment for use in a downstream task, e.g., by making use of an unsupervised learning technique on a data set of DNA sequence fragments, or an output for the downstream task. Examples of downstream tasks include promoter site prediction, methylation analysis, predicting functional effects of non-coding variants, and so on.

In some cases, the machine learning task is a combination of multiple individual machine learning tasks, i.e., the neural network is configured to perform multiple different individual machine learning tasks, e.g., two or more of the machine learning tasks mentioned above. For example, the neural network can be configured to perform multiple individual natural language understanding tasks. Optionally, the network input can include an identifier for the individual natural language understanding task to be performed on the network input. As another example, the neural network can be configured to perform multiple individual image processing or computer vision tasks, i.e., by generating the output for the multiple different individual image processing tasks in parallel by processing a single input image.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it, software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method including: receiving input data including one or more objects, wherein the input data includes one or more frames of images, wherein the one or more objects are captured in the one or more frames of images and each are associated with at least a text and a particular type; processing the one or more frames of images, by using a first machine learning model, to generate a first model output including data that identifies an existence of a particular object of the one or more objects and specifies characteristics of the particular object, wherein the characteristics include at least a plurality of key points associated with the particular object; determining a type of the particular object based on the characteristics, wherein the type includes a single-row type and a multi-row type; generating a single-row representation of the particular object as representation data based on data specifying the particular object; and processing the representation data, by using a second machine learning model, to generate a second model output including a sequence of initially-predicted characters corresponding to a text associated with the particular object; wherein the first and second machine learning models have been trained simultaneously based on the same sets of training data including a collection of objects.

Embodiment 2 is the method of Embodiment 1, wherein the characteristics of the particular object further includes at least one of a color or a confidence level of the existence of the particular object in the input data, wherein the color includes at least one of a background color or a text color associated with the particular object.

Embodiment 3 is the method of Embodiment 1 or 2, determining the type of the particular object, the particular object corresponding to a vehicle license plate, includes: determining one or more pairs of key points of a plurality of key points associated with the vehicle license plate; calculating respective distances between the one or more pairs of key points of the plurality of key points; determining whether at least one of the respective distances exceed a threshold distance value; in response to determining that the at least one of the respective distances exceeds the threshold distance value, determining that the vehicle license plate is a multi-row type; and in response to determining that the distances do not exceed the threshold distance value, determining that the vehicle license plate is a single-row type.

Embodiment 4 is the method of Embodiment 3, wherein generating a single-row representation of the vehicle license plate as the representation data includes: in response to determining that the vehicle license plate is a multi-row type, generating the single-row representation of the multi-row type vehicle license plate as the representation data by modifying data specifying the multi-row type vehicle license plate; and in response to determining that the vehicle license plate is a single-row type, providing data specifying the single-row type vehicle license plate as the representation data to the second machine learning model.

Embodiment 5 is the method of any Embodiment 3 or 4, wherein generating the single-row representation of the multi-row type vehicle license plate as the representation data includes: modifying data representing the multi-row type vehicle license plate by rectifying an image of the multi-row type vehicle license plate; identifying a first portion and a second portion of the rectified image of the multi-row type vehicle license plate, wherein the first portion is different from the second portion; adjusting the first portion to match at least a height of the second portion; and aligning the adjusted first portion and the second portion in a single row to form the single-row representation of the multi-row type vehicle license plate.

Embodiment 6 is the method of any one of Embodiments 1-5, wherein generating the second model output includes: for each location of the sequence of initially-predicted characters, generating a respective initial prediction of a character for the location, wherein each initially-predicted character includes at least one of a blank space, a number, a letter, or a symbolic character, wherein the initial predictions each are associated with a respective likelihood for the initially-predicted character to be in the location, and wherein the respective likelihoods form a probability vector; wherein the sequence of initially-predicted characters have a fixed length, and wherein the probability vector has the same fixed-length.

Embodiment 7 is the method of any one of Embodiments 1-6, further including: determining whether one or more blank spaces or one or more redundant occurrences exist in the sequence of initially-predicted characters; and in response to determining that one or more blank spaces or one or more redundant occurrences exist in the sequence of initially-predicted characters, removing the one or more blank spaces or the one or more redundant occurrences from the sequence of initially-predicted characters to generate a sequence of predicted characters corresponding to the text associated with the particular object.

Embodiment 8 is a system including one or more computers and one or more storage devices storing instructions that when executed by one or more computers cause the one or more computers to perform respective operations, the operations including the method of any one of Embodiments 1-7.

Embodiment 9 is one or more computer-readable storage media storing instructions that when executed by one or more computers cause the one or more computers to perform respective operations, the respective operations including the method of any one of Embodiments 1-8.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain cases, multitasking and parallel processing may be advantageous.

What is claimed is:

1. A method comprising:
   receiving input data including one or more objects, wherein the input data comprises one or more frames of images, wherein the one or more objects are captured in the one or more frames of images and each is associated with at least a text and a particular type;
   processing the one or more frames of images, by using a first machine learning model, to generate a first model output comprising data that identifies an existence of a particular object of the one or more objects and specifies characteristics of the particular object, wherein the characteristics comprise at least a plurality of key points associated with the particular object;
   determining a type of the particular object based on the characteristics, wherein the type comprises a single-row type or a multi-row type;
   generating a single-row representation of the particular object as representation data based on data specifying the particular object; and
   processing the representation data, by using a second machine learning model, to generate a second model output comprising a sequence of initially-predicted characters corresponding to a text associated with the particular object;
   wherein the first and second machine learning models have been trained simultaneously based on the same sets of training data comprising a collection of objects.

2. The method of claim 1, wherein the characteristics of the particular object further comprise at least one of a color or a confidence level of the existence of the particular object in the input data, wherein the color comprises at least one of a background color or a text color associated with the particular object.

3. The method of claim 1, wherein determining the type of the particular object, the particular object corresponding to a vehicle license plate, comprises:
   determining one or more pairs of key points of a plurality of key points associated with the vehicle license plate;
   calculating respective distances between the one or more pairs of key points of the plurality of key points;
   determining whether at least one of the respective distances exceeds a threshold distance value;
   in response to determining that the at least one of the respective distances exceeds the threshold distance value, determining that the vehicle license plate is a multi-row type; and
   in response to determining that the distances do not exceed the threshold distance value, determining that the vehicle license plate is a single-row type.

4. The method of claim 3, wherein generating a single-row representation of the vehicle license plate as the representation data comprises:
   in response to determining that the vehicle license plate is a multi-row type, generating the single-row representation of the multi-row type vehicle license plate as the representation data by modifying data specifying the multi-row type vehicle license plate; and
   in response to determining that the vehicle license plate is a single-row type, providing data specifying the single-row type vehicle license plate as the representation data to the second machine learning model.

5. The method of claim 3, wherein generating the single-row representation of the multi-row type vehicle license plate as the representation data comprises:
   modifying data representing the multi-row type vehicle license plate by rectifying an image of the multi-row type vehicle license plate;
   identifying a first portion and a second portion of the rectified image of the multi-row type vehicle license plate, wherein the first portion is different from the second portion;
   adjusting the first portion to match at least a height of the second portion; and
   aligning the adjusted first portion and the second portion in a single row to form the single-row representation of the multi-row type vehicle license plate.

6. The method of claim 1, wherein generating the second model output comprises:
   for each location of the sequence of initially-predicted characters, generating a respective initial prediction of a character for the location, wherein each initially-predicted character comprises at least one of a blank space, a number, a letter, or a symbolic character, wherein each of the initial predictions is associated with a respective likelihood for the initially-predicted character to be in the location, and wherein the respective likelihoods form a probability vector; wherein the sequence of initially-predicted characters have a fixed length, and wherein the probability vector has the same fixed-length.

7. The method of claim 1, further comprising:
   determining whether one or more blank spaces or one or more redundant occurrences exist in the sequence of initially-predicted characters; and
   in response to determining that one or more blank spaces or one or more redundant occurrences exist in the sequence of initially-predicted characters, removing the one or more blank spaces or the one or more redundant occurrences from the sequence of initially-predicted characters to generate a sequence of predicted characters corresponding to the text associated with the particular object.

8. A system comprising one or more computers and one or more storage devices storing instructions that when executed by one or more computers cause the one or more computers to perform respective operations, the operations comprising:

receiving input data including one or more objects, wherein the input data comprises one or more frames of images, wherein the one or more objects are captured in the one or more frames of images and each is associated with at least a text and a particular type;

processing the one or more frames of images, by using a first machine learning model, to generate a first model output comprising data that identifies an existence of a particular object of the one or more objects and specifies characteristics of the particular object, wherein the characteristics comprise at least a plurality of key points associated with the particular object;

determining a type of the particular object based on the characteristics, wherein the type comprises a single-row type or a multi-row type;

generating a single-row representation of the particular object as representation data based on data specifying the particular object; and processing the representation data, by using a second machine learning model, to generate a second model output comprising a sequence of initially-predicted characters corresponding to a text associated with the particular object;

wherein the first and second machine learning models have been trained simultaneously based on the same sets of training data comprising a collection of objects.

9. The system of claim 8, wherein the characteristics of the particular object further comprise at least one of a color or a confidence level of the existence of the particular object in the input data, wherein the color comprises at least one of a background color or a text color associated with the particular object.

10. The system of claim 8, wherein determining the type of the particular object, the particular object corresponding to a vehicle license plate, comprises:

determining one or more pairs of key points of a plurality of key points associated with the vehicle license plate;

calculating respective distances between the one or more pairs of key points of the plurality of key points;

determining whether at least one of the respective distances exceeds a threshold distance value;

in response to determining that the at least one of the respective distances exceeds the threshold distance value, determining that the vehicle license plate is a multi-row type; and in response to determining that the distances do not exceed the threshold distance value, determining that the vehicle license plate is a single-row type.

11. The system of claim 10, wherein generating a single-row representation of the vehicle license plate as the representation data comprises:

in response to determining that the vehicle license plate is a multi-row type, generating the single-row representation of the multi-row type vehicle license plate as the representation data by modifying data specifying the multi-row type vehicle license plate; and in response to determining that the vehicle license plate is a single-row type, providing data specifying the single-row type vehicle license plate as the representation data to the second machine learning model.

12. The system of claim 10, wherein generating the single-row representation of the multi-row type vehicle license plate as the representation data comprises:

modifying data representing the multi-row type vehicle license plate by rectifying an image of the multi-row type vehicle license plate;

identifying a first portion and a second portion of the rectified image of the multi-row type vehicle license plate, wherein the first portion is different from the second portion;

adjusting the first portion to match at least a height of the second portion; and aligning the adjusted first portion and the second portion in a single row to form the single-row representation of the multi-row type vehicle license plate.

13. The system of claim 8, wherein generating the second model output comprises:

for each location of the sequence of initially-predicted characters, generating a respective initial prediction of a character for the location, wherein each initially-predicted character comprises at least one of a blank space, a number, a letter, or a symbolic character, wherein each of the initial predictions is associated with a respective likelihood for the initially-predicted character to be in the location, and wherein the respective likelihoods form a probability vector; wherein the sequence of initially-predicted characters have a fixed length, and wherein the probability vector has the same fixed-length.

14. The system of claim 8, wherein the operations further comprise:

determining whether one or more blank spaces or one or more redundant occurrences exist in the sequence of initially-predicted characters; and in response to determining that one or more blank spaces or one or more redundant occurrences exist in the sequence of initially-predicted characters, removing the one or more blank spaces or the one or more redundant occurrences from the sequence of initially-predicted characters to generate a sequence of predicted characters corresponding to the text associated with the particular object.

15. One or more computer-readable storage media storing instructions that when executed by one or more computers cause the one or more computers to perform respective operations, the respective operations comprising:

receiving input data including one or more objects, wherein the input data comprises one or more frames of images, wherein the one or more objects are captured in the one or more frames of images and each is associated with at least a text and a particular type;

processing the one or more frames of images, by using a first machine learning model, to generate a first model output comprising data that identifies an existence of a particular object of the one or more objects and specifies characteristics of the particular object, wherein the characteristics comprise at least a plurality of key points associated with the particular object;

determining a type of the particular object based on the characteristics, wherein the type comprises a single-row type or a multi-row type;

generating a single-row representation of the particular object as representation data based on data specifying the particular object; and processing the representation data, by using a second machine learning model, to generate a second model output comprising a sequence of initially-predicted characters corresponding to a text associated with the particular object;

wherein the first and second machine learning models have been trained simultaneously based on the same sets of training data comprising a collection of objects.

16. The one or more computer-readable storage media of claim 15, wherein the characteristics of the particular object further comprise at least one of a color or a confidence level of the existence of the particular object in the input data, wherein the color comprises at least one of a background color or a text color associated with the particular object.

17. The one or more computer-readable storage media of claim 15, wherein determining the type of the particular object, the particular object corresponding to a vehicle license plate, comprises:
   determining one or more pairs of key points of a plurality of key points associated with the vehicle license plate;
   calculating respective distances between the one or more pairs of key points of the plurality of key points;
   determining whether at least one of the respective distances exceeds a threshold distance value;
   in response to determining that the at least one of the respective distances exceeds the threshold distance value, determining that the vehicle license plate is a multi-row type; and
   in response to determining that the distances do not exceed the threshold distance value, determining that the vehicle license plate is a single-row type.

18. The one or more computer-readable storage media of claim 17, wherein generating a single-row representation of the vehicle license plate as the representation data comprises:
   in response to determining that the vehicle license plate is a multi-row type, generating the single-row representation of the multi-row type vehicle license plate as the representation data by modifying data specifying the multi-row type vehicle license plate; and
   in response to determining that the vehicle license plate is a single-row type, providing data specifying the single-row type vehicle license plate as the representation data to the second machine learning model.

19. The one or more computer-readable storage media of claim 15, wherein generating the second model output comprises:
   for each location of the sequence of initially-predicted characters, generating a respective initial prediction of a character for the location, wherein each initially-predicted character comprises at least one of a blank space, a number, a letter, or a symbolic character, wherein each of the initial predictions is associated with a respective likelihood for the initially-predicted character to be in the location, and wherein the respective likelihoods form a probability vector; wherein the sequence of initially-predicted characters have a fixed length, and wherein the probability vector has the same fixed-length.

20. The one or more computer-readable storage media of claim 15, wherein the operations further comprise:
   determining whether one or more blank spaces or one or more redundant occurrences exist in the sequence of initially-predicted characters; and
   in response to determining that one or more blank spaces or one or more redundant occurrences exist in the sequence of initially-predicted characters, removing the one or more blank spaces or the one or more redundant occurrences from the sequence of initially-predicted characters to generate a sequence of predicted characters corresponding to the text associated with the particular object.

* * * * *